United States Patent
Cheng et al.

[11] Patent Number: 6,105,155
[45] Date of Patent: Aug. 15, 2000

[54] METHOD AND APPARATUS FOR PERFORMING ON-CHIP FUNCTION CHECKS AND LOCATING DETECTED ANOMALIES WITHIN A NESTED TIME INTERVAL USING CRCS OR THE LIKE

[75] Inventors: Joe-Ming Cheng, Cupertino; Shanker Singh, Morgan Hill, both of Calif.

[73] Assignee: International Business Machines Corporation, Armonk, N.Y.

[21] Appl. No.: 09/010,726

[22] Filed: Jan. 21, 1998

[51] Int. Cl.[7] .................................................. G01R 31/28
[52] U.S. Cl. ........................ 714/736; 714/735; 714/737; 714/738
[58] Field of Search .................................. 714/735, 736, 714/737, 738, 734

[56] References Cited

U.S. PATENT DOCUMENTS

| | | | |
|---|---|---|---|
| 5,475,694 | 12/1995 | Ivanov et al. | 714/732 |
| 5,638,381 | 6/1997 | Cho et al. | 714/732 |
| 5,652,754 | 7/1997 | Pizzica | 714/732 |
| 5,663,967 | 9/1997 | Lindberg et al. | 714/737 |
| 5,671,237 | 9/1997 | Zook | 714/755 |
| 5,675,588 | 10/1997 | Maruyama et al. | 714/715 |
| 5,745,500 | 4/1998 | Damarla et al. | 714/732 |
| 5,831,988 | 11/1998 | Fagerness | 714/719 |

OTHER PUBLICATIONS

A. S. Tanenbaum, "Distributed Operating Systems", *Prentice Hall*, Chapter 3, 1995, pp. 120–127.

*Primary Examiner*—Albert De Cady
*Assistant Examiner*—Jason Greene
*Attorney, Agent, or Firm*—R. Bruce Brodie; William D. Gill

[57] ABSTRACT

A method and apparatus in which on-chip functions are checked and any detected anomalies are located within a nested time interval. An on-chip function is tested by (1) applying a predetermined data pattern to the function, (2) computing a linear block error detection code residue from any output from the function being tested, and (3) comparing the residue to a error code residue (signature) derived from the output of a copy of the same function with the same data pattern. In one embodiment, the code signature has been previously derived from an error-free copy of the function. Where the signature is supplied contemporaneously by another copy of the same function also being tested, the function copy is not presumed error free. In both cases, any mismatch between the on-chip code residue and the signature indicates error, erasure, or fault. By either recursive reprocessing or shortening the intervals between comparisons, the mismatch can be located within a nested time or sequence interval.

12 Claims, 6 Drawing Sheets

CHIP FUNCTION MODIFIED TO INCLUDE CRC SELF TEST

PAIRWISE FUNCTION TESTING OF CHIPS USING
COMMON EXTERNAL COMPARISON LOGIC

CHIP FUNCTION MODIFIED TO
INCLUDE CRC SELF TEST

BUILT-IN SELF-TEST (BIST) USING A PROGRAM
FOR CHIP FUNCTION WITH CRC CHECKING

FLOW OF CONTROL FOR CHIP FUNCTION MODIFIED TO INCLUDE CRC SELF-TEST

CRC REMAINDER GENERATED USING A POLYNOMIAL OF DEGREE 6 AND REGISTER $G(X) = X^6 + X^5 + X^4 + X^3 + 1$

CRC REMAINDER GENERATED USING A POLYNOMIAL OF DEGREE 32 AND REGISTER $P(X) = X^{32} + X^{23} + X^2 + X + 1$

METHOD AND APPARATUS FOR PERFORMING ON-CHIP FUNCTION CHECKS AND LOCATING DETECTED ANOMALIES WITHIN A NESTED TIME INTERVAL USING CRCS OR THE LIKE

FIELD OF THE INVENTION

This invention relates to function testing on logic chips or the like, and more particularly to the on-board or remote cross and self-checking of functions on the chips independent of clock synchronism and without a mandatory change of mode.

DESCRIPTION OF RELATED ART

Semiconductor chips are physically and electrically closed clusters of function which are increasingly difficult to test by direct measurement or functional comparison, especially as clock operating speeds approach the 300 MHz to 2000 MHz range. The first paragraph defines the chip for this invention and discusses some general attributes. This is followed by comments on the prior art of testing chips by executing the functions in parallel and directly comparing similar attributes. In addition, a brief exposition is made concerning the inherent difficulty in clock synchronization among the very high-speed chips and their functions. Lastly, the well-known prior art POST and BIST chip-testing methods are briefly described.

Aspects of Chips and Functions

As used in this specification, the term "chip" connotes any information handling system assemblage testable principally at its input, output, and utility ports or "pins". In this regard, a "chip" may be embodied as an integral semiconductive substrate or the like upon which any self- or externally-clocked electronic circuits, pathways, or functions have been etched, layered, or deposited, and to which external access is restricted to a finite number of ports or "pins".

It is a matter of common knowledge that the chip or integrated circuit art has increased the component density/$m^2$ and component operating and clocking speeds by orders of magnitude over the decades from 1949 to the present. Indeed, the largest capacity memory chips can hold around 10 megabytes of information per chip, while in the future they will likely be able to hold hundreds to thousands of megabytes. Relatedly, in the spring of 1997, Intel Corporation announced a 233 MHz Pentium Pro microprocessor chip for personal computer use. They further stated that by the spring of 1998, they expect their Pentium II processor chip family to include versions operating at 400 MHz to 450 MHz. Similarly, IBM introduced a 250 MHz version of the PowerPC 604e microprocessor chip in June 1997. Even though circuit density on a chip has been increased many fold, the number of chip input, output, and utility ports is finite. Chips sport ports in the range of 400–800 pins. This is, in part, because a port must have a minimum size in order to constitute a reliable physical, mechanical, and electrical connection for any standard chip circumference.

Function Testing of Chips Using Common External Comparators

In the prior art, one testing configuration involved applying the same input data pattern to functionally identical and symmetric units and comparing the outputs. Where the functionally symmetric units are very high-speed microprocessors or the like, such outboard comparison tests are uneconomic and inaccurate. First, outboard comparison testing requires physically coupling all of the ports of each chip to the comparator. This means that circuits operating at 200 MHz to 500 MHz speeds are especially susceptible to electromagnetic induction and power supply modulation as a function both of noise and phase jitter. This can result in significant signal and clock deskewing, in addition to signal distortions on the parallel lines and paths constituting the port couplings between the units under test and the outboard comparator. Another source of jitter emanates from external phase-locked loop clocks and the like.

A second source of difficulty relates to the failure of clock synchronization between the units being tested. In this regard, Tanenbaum, "Distributed Operating Systems", *Prentice Hall*, 1995, pp. 120–127, quotes Lamport in his paper entitled "Time, Clocks, and the Ordering of Events in a Distributed System", *Communications of the ACM*, Vol. 21, pp. 558–564, July 1978. Lamport pointed out that if two processes do not interact, then it is not necessary that their clocks be synchronized. He further pointed out that the significant aspect is not that all processes agree on the exact time. Rather, the important aspect is that they agree on the order in which events occur.

Unfortunately, the testing of a pair of symmetric functional units (microprocessors) by a common outboard comparator does constitute an interaction between the tested units. Indeed, as the speeds of such units approach the 1000 MHz/sec range, the effects of any variance including clock drift, noise, jitter, or deskew become exacerbated. In order that a pair of logical clocks view a series of events in the same logical order, Lamport imposed a protocol using a Boolean transitive relation "happen-before". This relation is necessarily imposed on the events both within each processor and on the messages between the processors, and adds significant testing complexity to the chip configuration.

Power-on Self-testing (POST) and Built-in Self-testing (BIST)

Power-on Self-testing (POST) and Built-in Self-testing (BIST) define the ends of a chip-testing continuum. POST is a software-driven test of chip/chipset function when a system is initially powered on. The POST test comprises a large number of software diagnostics. These diagnostics are custom designed to exercise a chip or chipset on a function-by-function and power boundary-by-power boundary basis. While viewed as reliable, POST suffers from long execution times, uses a small number of hardware tap points, and requires code retrofitting for any functional design variance. One reason for the long execution time is that POST exercises functions one at a time, then two at a time, etc.

In contrast, BIST comprises a pseudo-random pattern generator (PRPG) or the like for driving the function being tested and some type of output measuring circuit. Advantageously, BIST utilizes a large number of hardware tap points. However, while randomized input patterns will eventually elucidate whether the functional response is within accepted norms, the run lengths of random patterns can be long. Usually, the BIST mode is operated at a clock rate substantially less than the normal chip or function mode clock rate. The lower clock rate minimizes susceptibility to the higher frequency effects of noise and jitter. Thus, the extrapolation of the BIST sample test results as accurately representing the population of events at a substantially higher clock frequency is subject to doubt. Also, BIST involves disrupting the normal mode and the processing of its internal states is a nonreentrant.

SUMMARY OF THE INVENTION

It is an object of this invention to devise a nondestructive method and apparatus for testing one or more chip functions and locating any detected anomalies.

It is a related object that such method and apparatus be extensible to concurrently testing the same function or suite of functions on a plurality of chips.

It is another object that such method and apparatus be operable independent of clock synchronism and without mandatory change of mode.

It is still another object that it can be integrated into the normal work flow of the function under test. This avoids the overhead attendant periodic and dedicated function testing.

The foregoing objects are believed satisfied by a method and apparatus in which on-chip function are checked, and any detected anomalies are located within a nested time interval. This stems from several observations.

First, an indicator of error, erasure, or fault in a function can be obtained by (1) applying a known and predetermined pattern of data as input to the on-chip function under test, (2) computing a linear block error detection code residue from any output derived from the function, and (3) comparing the residue to an error code residue (signature) derived from a copy of the same function under the same pattern of input and known to be free of error, erasure, or fault.

Second, the code signature can be recorded from the past or supplied contemporaneously by another copy of the same function also being tested. Third, by either recursive reprocessing or reducing the time or number of cycles between checkpoint intervals, the procedure can locate the occurrence of any mismatch within a nested time or sequence interval.

This anomaly indication and time of occurrence information is then passed onto error isolation procedures. The latter are suites of procedures designed to identify, and resolve whether an anomaly is an error, erasure, or fault and take further corrective action. While these procedures are outside the scope of the invention, nevertheless the additional information provided by the method and apparatus of the invention should enhance the likelihood of ultimate recovery.

One variant of the coding and comparison steps involves taking a first code residue over the data input pattern and logically combining it with the code residue taken over the function output. This logically combined residue is then compared with a signature of a logically combined residue derived from another copy of the same function to which the same data pattern has been applied.

In the method and means of this invention, a cyclic redundancy code (CRC) exemplifies one of a class of linear block codes that can be efficiently used with an n-bit pattern of data. Encoding comprises taking the remainder formed by dividing a polynomial representation of a Galois field n-bit pattern of data by a suitable CRC generator polynomial. In the case of the first variant, a first CRC remainder (check bits) is taken over n-bits of input as applied to the chip function being tested, while a second CRC remainder is taken over n-bits of responsive output from the function.

In the variant, the computed first and second CRCs are logically combined and written into a local chip register. In one embodiment of the invention, at least one CRC signature is stored in a buffer. In this regard, a buffer-stored CRC signature is a CRC remainder for the same coding polynomial that has previously been derived over a counterpart n-bit data pattern. The CRC signature was determined from the n-bit data pattern applied as input to and as output obtained from a copy of the function known to be error, erasure, or fault free.

Next, the logically combined CRCs in the local register are comparison matched with the stored CRC signature as indexed from the buffer by the n-bit pattern. In the event that the comparison results in a match between the combined and calculated CRCs and the prestored version, then either the steps are repeated over another n-bit datastream input or the test is terminated. Relatedly, in the event the comparison results in a mismatch, then the method can be recursively repeated over the n-bit pattern. This recursive repetition isolates any nested subinterval of time to a predetermined resolution within which an error, erasure, or fault occurred. Alternatively, the interval between comparisons can be shortened.

Of some interest is the fact that the polynomial for CRC use is one selected from the set expressed in Galois field arithmetic consisting of $(x^{16}+x^{12}+x^5+1)$, $(x^{32}+x^{23}+x+1)$, and $(x^{32}+x^{26}+x^{23}+x^{22}+x^{16}+x^{12}+x^{11}+x^{10}+x^8+x^7+x^5+x^4+x^2+1)$. In addition, the nested subinterval size and resolution is determined by the degree of the highest term in the CRC polynomial. It is also the case that the recursive repetition of the method constitutes a recursive binary search to locate the error, erasure, or fault within the nested subinterval.

Clearly, a mismatch between the dynamically calculated CRCs and the predetermined CRC over the test pattern and the function outputs is indicative of error, erasure, or fault. Replaying the steps several times permits a recursive comparison between the CRCs. In addition, in the event that the mismatch persists, the error, erasure, or fault is not transient. Also, this provides the resolving power in the sense of a binary tree search to isolate the error location in ever diminishing extent in the n-bit test pattern. For instance, the first pass might indicate the first or second half of the stream. The second pass might indicate which quarter. The third pass might indicate which eighth of the stream is in question, etc.

Advantageously, the invention permits many functions to be tested on a single chip. All that is needed is a known input data pattern and a suite of predetermined CRCs covering both the pattern input and the function output. As the known input pattern is applied to a first function, the CRCs covering the input and first function output are calculated and written into a register and compared against the first predetermined CRC. This test can then be repeated with each of the remaining functions having predetermined CRCs in the suite. In many cases, the input data pattern can be the same.

The method and apparatus can also check on-chip functions and locate any detected anomalies within a nested time interval among pairs of like-function chips. In this extension, an n-bit stream of real data is applied as input to a pair of failure independent chips containing respective symmetric functional units. The respective first and second CRCs are computed over the n-bit datastream input and the output from the functional unit thereof on each chip. The computed CRCs are then logically combined and written into a local register on the same chip and into a shadow register on the chip opposite. Because the chips and functions reference asynchronous clocks, a form of message synchronization can be attained by modifying the CRC check bits to include unique synch symbols. The modified CRC check bits, upon being copied into the shadow register at the other chip, can be decoded by associated logic for clock adjustment purposes.

In this chip-pair, function-testing extension, the CRC function in the local register is comparison matched with the function in the local shadow register. This occurs on each chip. In the event the comparison results in a match respectively on both chips, then either steps are repeated over another n-bit datastream input or the test is terminated. In the event the comparison results in a mismatch on at least one of the chips, then the method is recursively repeated over the n-bit pattern. This recursive repetition isolates any nested subinterval of time to a predetermined resolution within which an error, erasure, or fault occurred.

Advantageously, the method and apparatus for testing same-function chip pairs or triples is that it supports highly simplified remote function testing. This arises where the first chip function is located at a remote site. This chip can be tested against a second chip of a pair at a central point or station as described above.

The method and apparatus of this invention provide a nondestructive and efficient modality for early functional detection of anomaly and its location within an interval over a datastream of n cycles. This supplements rather than replaces the functions of error and erasure detection and correction. This should enhance the ability of any data recovery procedures (DRPs) to identify and resolve any detected error, erasure, or fault with particularity and dispatch.

DESCRIPTION OF THE PREFERRED EMBODIMENT

Figure 1:
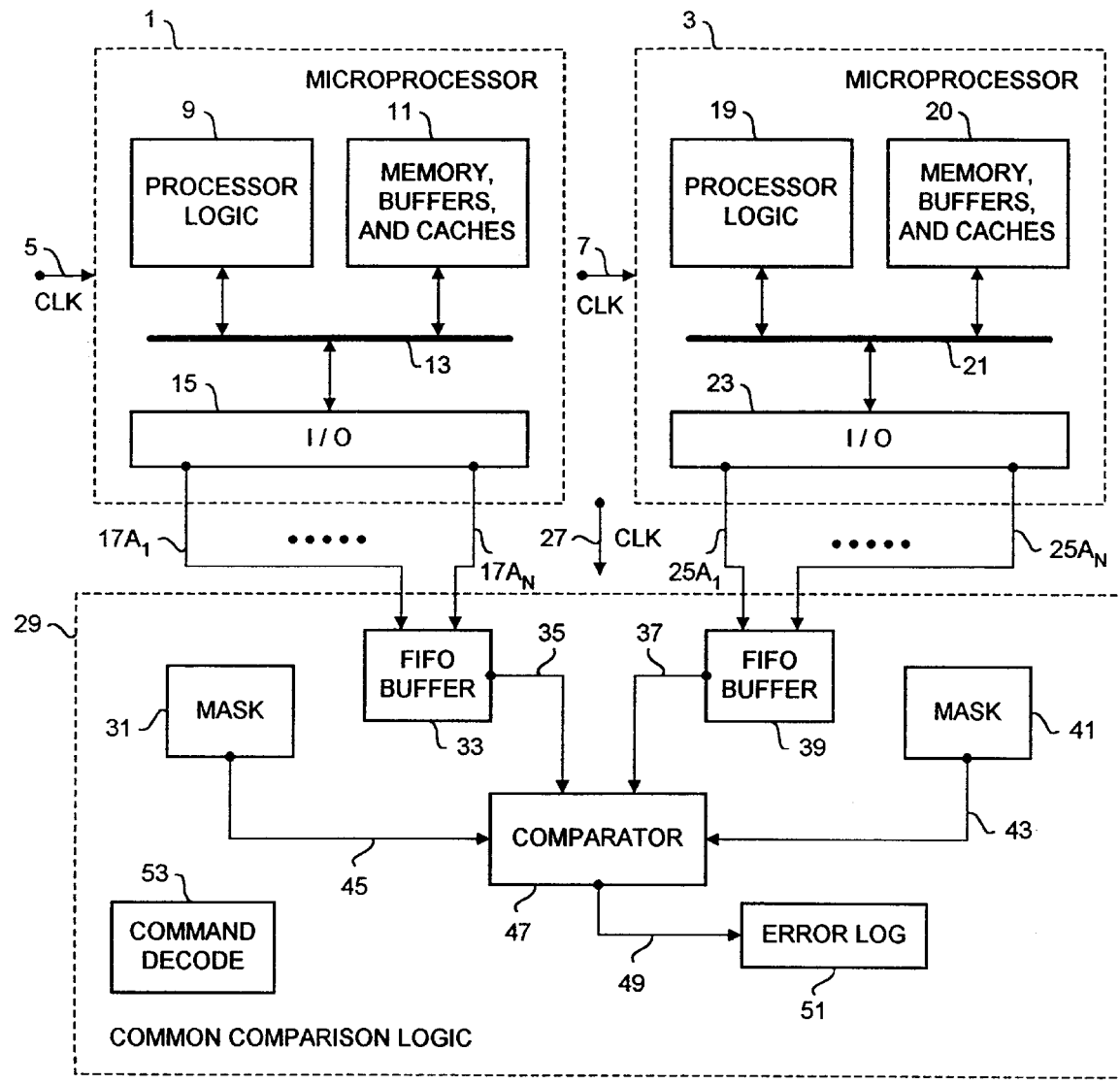
FIG. 1 shows function testing of chips using a common external comparator according to the prior art.

Referring now to FIG. 1, there is shown a prior art configuration for functional testing of chips well known in the prior art. In this figure, a pair of identical chips 1 and 3 having the same cluster of functions is the subject of a test. The chips are coupled to an external common comparison logic 29 over groups of pin connections 17A$_1$ to 17A$_N$. The cluster of functions might be in the form of a compression encoder/decoder, an Intel i960 microprocessor, or an IBM PowerPC 604e microprocessor. A single function could be expressed in the form of bitstream compression or expansion or the movement of data from one group of registers to another, etc.

The cluster of functions depicted in FIG. 1 are structurally and functionally identical microprocessors. Structurally, each processor includes processor logic 9, 19 for interpreting sequences of code and data from a clutch of memory, buffers, and caches 11, 20. The logic and memory communicate with each other via a bus 15, 23 and with the external world via the bus-attached I/O interface 15, 25. In this regard, each chip 1, 3 terminates in comparison logic 29 over a typical 80–100 pin interface. The pin interface would include memory address, data, control commands, and clocking. For instance, the data on pins 17A$_1$ to 17A$_N$ from chip 1 would be sent to FIFO buffer 33, while data on pins 25A$_1$ to 25A$_N$ from chip 3 would terminate in FIFO buffer 39. Masking of command or data operands is facilitated via register 31 and register 41. Clocking data (not shown) from each chip would also be pin coupled. The control or information state of each microprocessor would be construed by comparison logic 29 via the command decoder 53.

The comparison assumes the same control and information state should exist in the indicia presented by both machines and for each instruction as synchronously executed on both microprocessors. That is, comparator 47 should find no substantive difference in the state information on the paths (45, 35) from chip 1 from the data on the paths (37, 43) from chip 3 on an error-free pair of machines for a command as decoded by logic 53.

As previously mentioned, the clock rate for high-speed functions is in the range from 200 MHz upwards to 2000 MHz. The likelihood of being able to compare two synchronous interfaces unaffected by noise and jitter rapidly decreases as clock rate increases. Another consequence of speed increase is the opportunity cost of chip or board space dedicated to testing synchronous interfaces. A further limitation concerns loading. Each chip 1 and 3 must drive a full complement of pin-connected external load represented by logic 29. This itself adds an age, wear, and power dissipation dimension to synchronous external comparison testing. Lastly, the wiring of a large number of pin connections on each chip constitutes a significant cost and adds a source of physical complexity and a potential source of error given any pin wiring mistakes.

Figure 2:
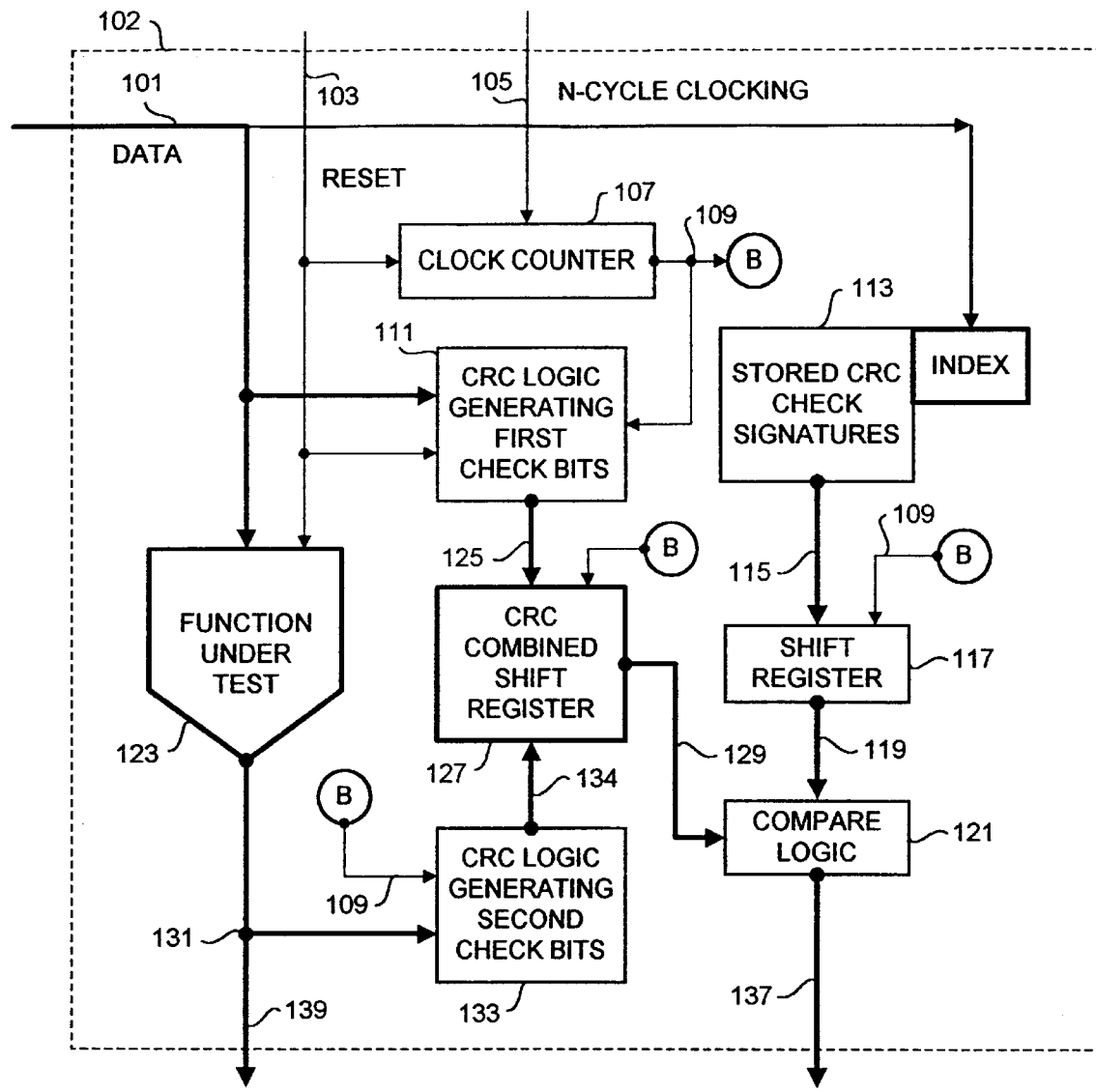
FIG. 2 illustrates a chip function modified to include CRC self-test features according to the invention.

Referring now to FIG. 2, there is shown a chip function modified to include CRC self-test features according to one variant of the invention. In FIG. 2, a chip 102 comprises a function 123 such as a data compression encoder or microprocessor. A binary or bitstream data input to the function 123 is applied over path 101. An output from the function appears as a bitstream response on path 139 to circuits external to the chip and on path 131 to facilities on the chip 102.

The chip is modified according to the invention through inclusion of CRC encoding logic 111, 133, 127, a data input indexable source of CRC signatures 113–119, comparison logic 121, and reset and clocking circuits 103, 107, and 109. It should be observed that any operative data flow is not necessarily interrupted by the on-chip test. That is, an n-bit data pattern serially or otherwise applied to the function 123 over path 101 and the function output on path 139 is read in parallel by CRC check bit encoders 111 and 133, respectively. The only interruption would occur when an error, erasure, or fault was detected and a given n-bit pattern was recursively applied to locate the smallest nested interval within which the anomaly was detected.

The activity on the chip is paced by external clocking signals on path 105 applied to clock counter 107. Counter 107 provides a signal after every N cycles on path 109. This determines the repetition interval and operates as control recycle input CRC check bit logic arrangements 111 and 133 and the two shift registers 127 and 117.

Operationally within the clocking interval, an n-bit data pattern on path 101 is applied as input to the function being tested 123 and to the index of CRC signature storage facility 113. The n-bit pattern accesses a CRC signature either on a content addressable basis or on a binary tree search basis from the facility 113. The accessed CRC signature is copied into register 115. Concurrently, CRC logic 113 derives CRC check bits from a copy of the n-bit input pattern. The derived CRC is written by logic 111 into a predetermined portion of register 127. As the function 123 generates an output on path 131 responsive to the n-bit input over path 101, CRC logic 133 derives CRC check bits over n-bits of output on path 131. This output derived CRC is written by logic 133 into another predetermined portion of register 127. Lastly, the CRCs in registers 127 and 117 are compared by logic 121. The state of the comparison match is indicated by a signal provided over path 137.

Referring yet again to FIG. 2, a less conservative variant would apply a known pattern of data to function 123 on path 101 as before. However, the the CRC residue over the output 131 would be applied directly from logic 133 to compare logic 121. This would eliminate CRC logic 111 and shift register 127. Indeed, register 117 could also be eliminated and the stored CRC signature be applied directly to compare logic 121.

Figure 6A:
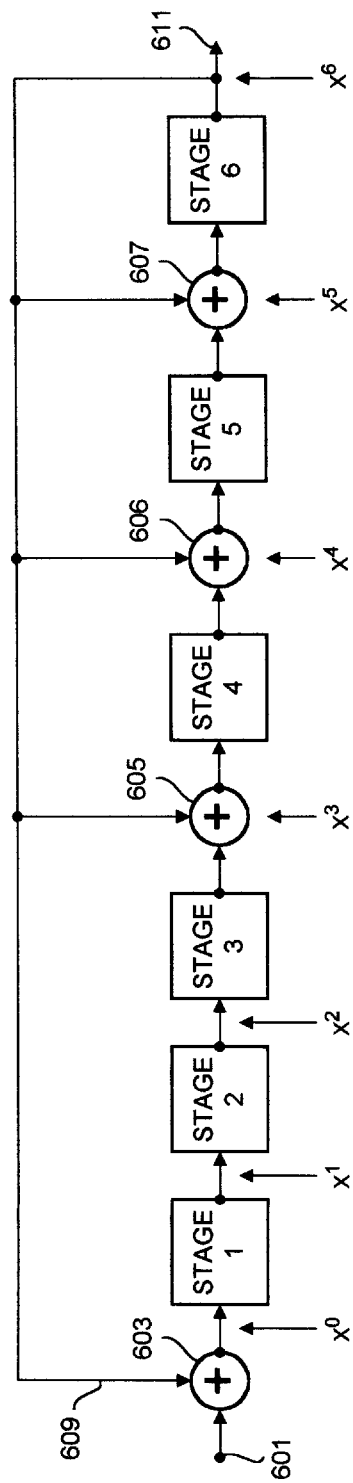
FIGS. 6A and 6B illustrate respectively a CRC remainder generated using a polynomial and register of degree 6 and a CRC remainder generated using a polynomial of degree 32.

Referring now to FIG. 6A, there is shown a feedback shift register of the type for generating cyclic redundancy check (CRC) bits. CRC encoding operates on an n-bit pattern or block of data as a unit. It mathematically treats a stream of data as if it were a polynomial in a Galois field. The encoding is obtained by dividing the data polynomial by a code generator polynomial also in a Galois field and utilizing the remainder as the code check bits. It is certainly known that a well-constructed CRC polynomial will detect any contiguous burst of errors shorter than the polynomial, any odd number of errors throughout the block, and any 2-bit errors anywhere within the block. The division of polynomials in a Galois field $\{2\ m\}$ is implemented in modulo 2 arithmetic in a register of a length corresponding to the remainder produced by the generating polynomial.

The register shown in FIG. 6A implements the generating polynomial $g(x)=(x^6+x^5+x^4+x^3+1)$. The register comprises six shift stages counterpart to the degree 6 of the CRC generating polynomial. Prior to use, the register is first cleared. then data are shifted into the register at port 601 and shifted to the right. Each shift is a form of polynomial multiplication. Each shift also shifts a bit out of the register at port 611. The output bit is also fed back on path 609 and exclusively OR'd at XOR gates 603, 605, 606, and 607. Algorithmically, the register division operation to secure the remainder can be represented in pseudo-code in the form of a While loop:

WILE {data bit exists}
  SHIFT register 1 bit right;
  READ next data bit into shift position 0 at input;
  IF a binary 1 present at output 611 and feedback path 609
    THEN register :=register XOR polynomial
END The register should now contain the desired CRC remainder or check bits.

Figure 6B:
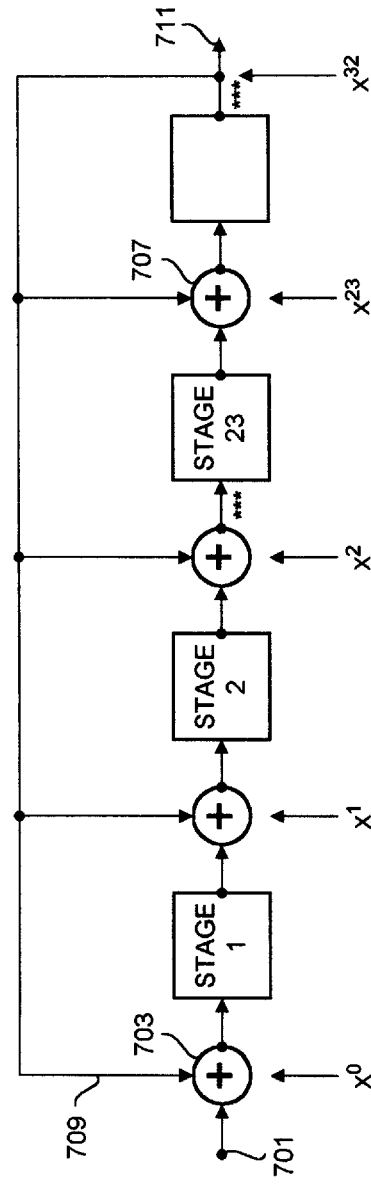

Referring now to FIG. 6B, there is shown a CRC shift register arrangement suitable for use with the preferred embodiment of the invention. Assuming for illustrative purposes that the n=32-bit data patterns are applied to the function then for degree 32 a CRC generating polynomial with desirable characteristics would be:

$$P(x)=x^{32}+X^{23}+x^2+x+1.$$

In FIG. 6B, the register is first cleared (set to all 0's) and then a 32-bit data pattern is serially shifted in at port 703. Whenever an output binary 1 on port 711 is fed back to the input port XOR gate 703 over path 709, the new data bit is XOR with the fed back value and shifted into stage 1. This process is repeated until all $n \geq 32$ bits have been entered into the register in this manner. At that point, the contents of the register constitute the CRC remainder and can be shifted out.

Figure 3:
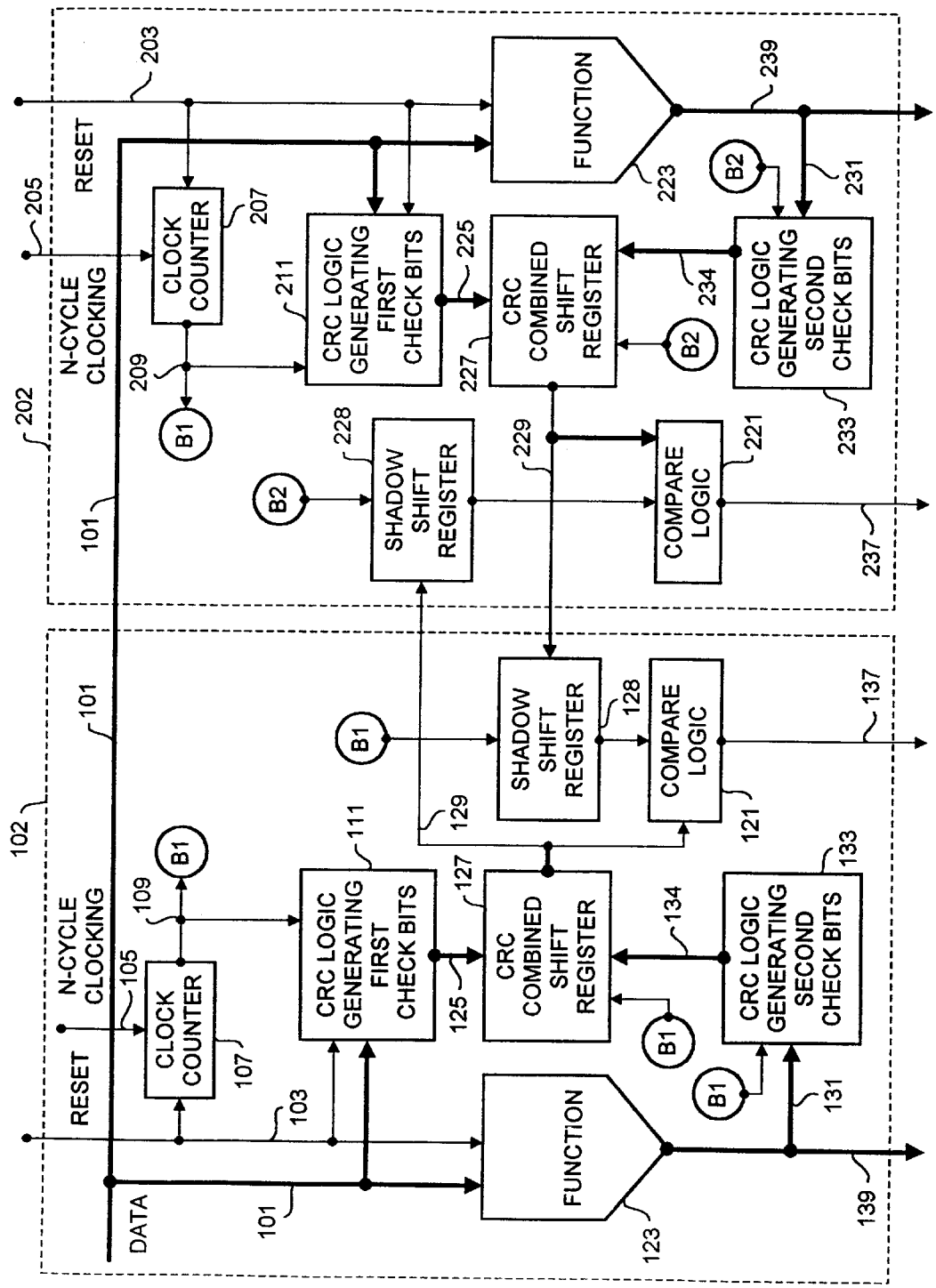
FIG. 3 depicts a pair of same-function chips modified to include CRC cross-check features according to the invention.

Referring now to FIG. 3, there is shown a pair of same-function chips modified to include CRC cross-check features according to the invention. The major conceptual difference between this embodiment and that shown in FIG. 2 is that a CRC check bit from another copy of a live function under test is being substituted for that of the CRC signature. In this embodiment, each chip of a pair of chips compares its locally generated CRC check bits with the CRC check bits of the other chip. If either comparison mismatches, then an anomaly has been detected, and the next step is to locate the anomaly within the smallest nested interval of the data pattern of the function output.

In FIG. 3, an n-bit data pattern is concurrently applied over path 101 to the inputs of functional logic 123 and 223. These functions reside on failure independent chips 102 and 202. Each chip 102 and 202 includes CRC check bit generating logic for its own local chip function input and output 111, 133; 211, 233 and local register 127, 227. Also, there is provided a shadow register 128, 228 and a path over which the local CRC check bits on one chip are copied into the shadow register on the other chip. Each chip further includes a comparison logic 121, 221 for matching the CRC check bits in the local register 127, 227 with the CRC check bits in the shadow register 128, 228. The state of the comparison match is indicated by a signal provided over paths 137 and 237.

Referring again to FIG. 3, each of the chips 102, 202 includes a separate reset 103, 203 and independently operable clocking facilities 105, 107, 109, B1; 205 207, 209, B2. This permits a degree of asynchronism between the two chips.

It should be appreciated that the CRC logic 111, 133; 211, 233 accumulates the check bits up to a predetermined number of n cycles. From there, the check bits are transferred into a counterpart shift register 127, 227. At this point, the contents of both the CRC local register and the local shadow register are transferred in a bit serial fashion to the counterpart comparison logic 127, 128, 121; 227, 228, 221. At this point, the CRC logic, unless otherwise interrupted continues to accumulate CRC check bits for the next comparison or check point interval. Although the comparison takes many cycles, it occurs in the background (parallel) and does not impede the throughput of the function under test.

The isolation of the occurrence of any detected anomaly can be processed as a matter of rerunning the n-bit data pattern through the function and recursively narrowing the interval within which the anomaly or mismatch is detected. Alternatively, the check point interval could be shortened. This is a matter of design choice for the skilled artisan.

Since two chips 102 and 202 are organized around two free-running clocks, it is desirable to provide some form of message synchronization between them. This can be accomplished by introducing synchronization information into the CRC check bits written out to the shadow register on the other chip. That is, CRC check bits could be encoded according to the following rules:

(a) Replace all binary "1's" in the CRC check bits by "01".
(b) Do not replace any CRC "0" bit.
(c) Initiate each synchronization encoded string with three or more 1's such as "111" or "1111".
(d) Use "011" as a delimiter for other symbols.

As an example, suppose an n=8-bit CRC check bits were "00001001". The synchronization information would be encoded as follows:

Steps (a) and (b) transform "0000 1001" into "0000 010001".
Steps (c) and (d) add the appropriate synchronization delimiter "111" to the stem "0000 010001" yielding "111 0000 010001 011".

Again referring to FIG. 3, the logic for synch encoding the CRC check bits should be interposed in chip 102 in path 129 between register 127 and shadow register 228 in chip 202. A similar arrangement should be interposed in chip 202 in path 229 between register 227 and shadow register 128 on chip 102. Likewise, the logic for synch decoding would be located on the chip opposite, also in the receiving shadow register path. The purpose of the decode logic is for detection of the synch marks "111" and to remap the CRC check bits "0000 010001" to "0000 1001" and write them into the shadow register. The synch marks "111" would be applied to the local clock as an adjustment. Since synch marks would be sent bilaterally, the clocks would both slew to a common point of resonance.

Figure 4:
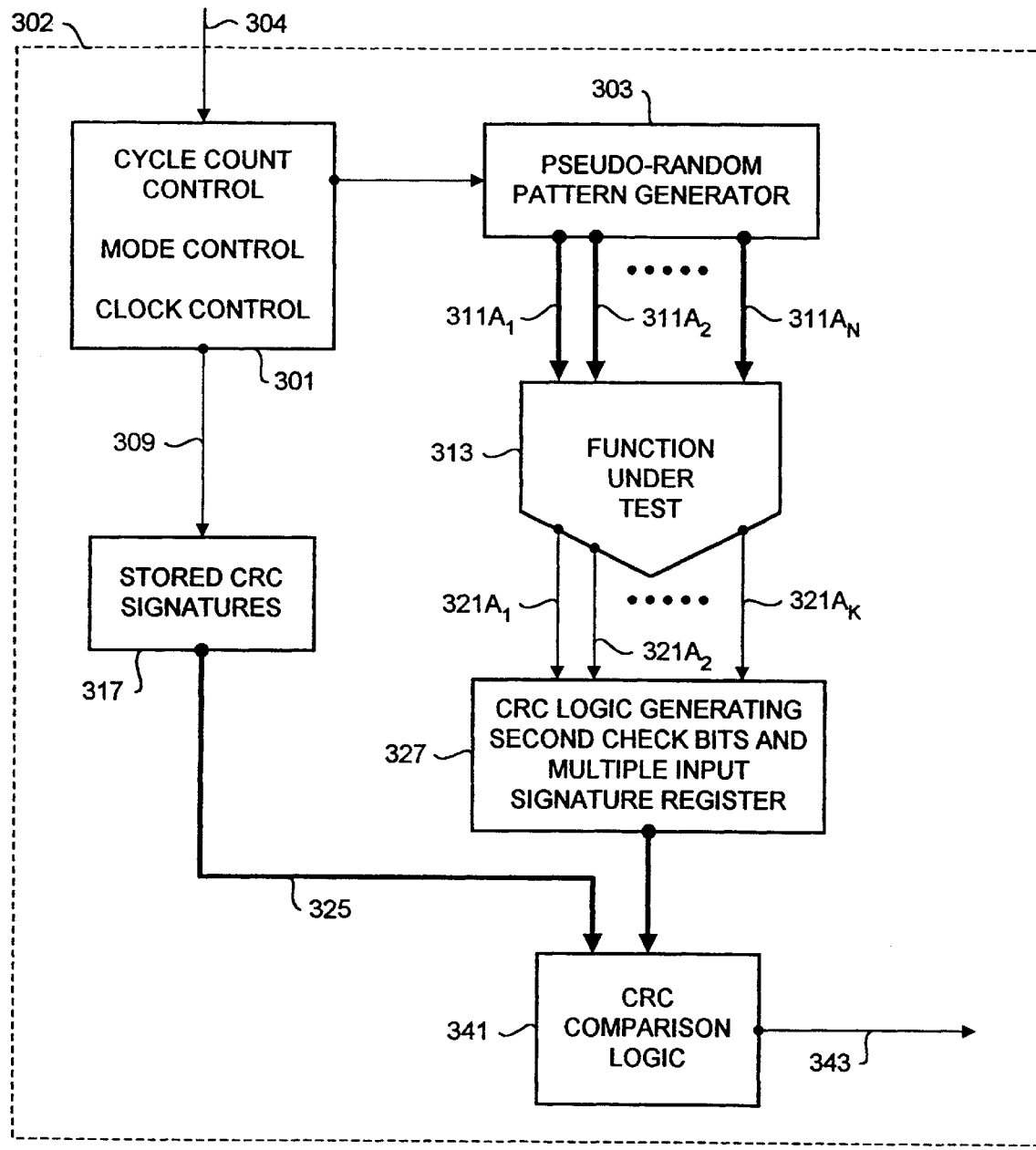
FIG. 4 sets out a built-in self-test (BIST) using a PRPG for the inventive chip function testing with CRC checking.

Referring now to FIG. 4, there is shown a chip having a built-in self-test (BIST) using a pseudo-random pattern generator (PRPG) for a CRC checking. In this configuration, a function 313 can be switched from a normal mode to a test mode. In this form of test, PRPG 303 applies an n-bit pattern to the function 313. The n-bit patterns are a selected subset of all possible 2n bit patterns for which CRC signatures have previously been derived. That is, each pattern of the subset was applied to a known error and fault-free function, and the CRC signatures derived from the input and function output. The CRC signatures were then written into an appropriate store or buffer 317.

In FIG. 4, responsive to pseudo-random selection of one of the subsets of n-bit patterns and its application to the function input, a CRC signature counterpart is extracted from the buffer 317 as a function either of a content addressable association (inverted index) or a binary tree directory to the buffer location. At the checkpoint interval, the contents of buffer 317 and the CRC logic 327 are bit serially applied to comparison logic 341. The state of the comparison match is indicated by a signal provided over path 343.

Figure 5:
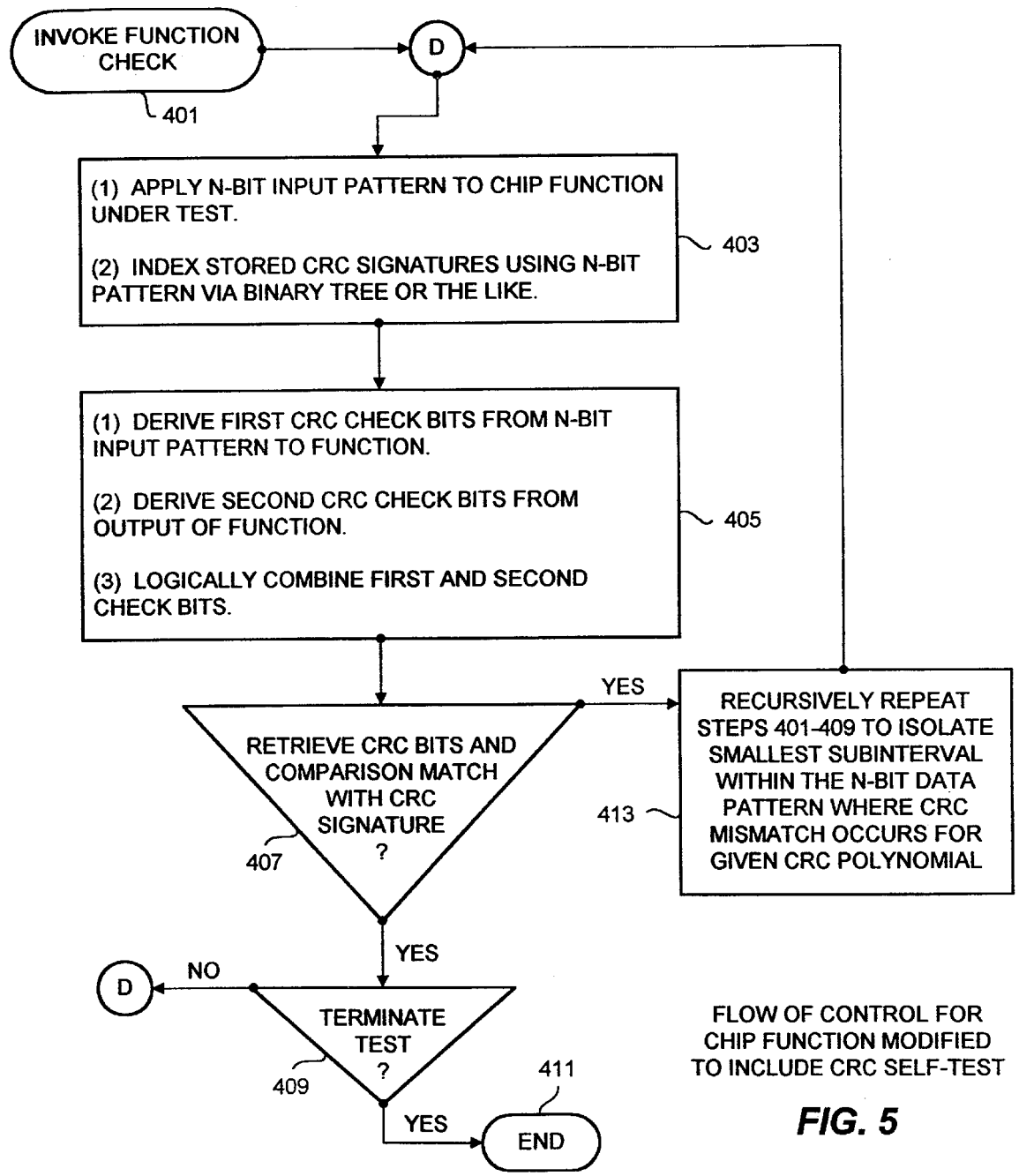
FIG. 5 shows the flow of control of the single chip function CRC test method of the invention.

Referring now to FIG. 5, there is shown the flow of control of the single chip function CRC test method of the invention. In this regard, step 401 is the invocation step. Step 403 correlates the application of a data pattern to the function under test and accesses a counterpart CRC signature. Step 405 requires that a CRC covering respectively the data input to the function and the output from the function be derived. The term "logically combined" can be any form of information lossless logical mapping, including merely concatenation in the same register. Step 407 comparison matches the derived CRCs with that of the CRC signature on a pairwise bit serial or other comparison basis. If the CRCs match, then the test either continues over other data input in step 409 or it terminates in step 411. If the CRCs do not match, then steps 403–409 are recursively repeated to isolate the smallest subinterval within which the anomaly can be resolved. One implementation of step 413 is to reprocess the first n/2 bits of the data pattern. If no mismatch occurs, then anomaly must be located in the other half. The appropriate half is then halved again, etc.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A method for performing nondestructive on-chip function checks and locating any detected anomalies within a nested time interval, comprising the steps of:

(a) applying an n-bit data pattern as input to a chip containing at least one functional unit and computing respective first and second cyclic redundancy checks (CRCs) over the n-bit data pattern as input applied to the function and any output from the function on that chip for a CRC coding polynomial selected from from the set expressed in Galois field arithmetic consisting of $(x^{16}+x^{12}+x^5+1)$, $(x^{32}+x^{23}+x+1)$, and $(x^{32}+x^{26}+x^{23}+x^{22}+x^{16}+x^{12}+x^{11}+x^{10}+x^8+x^7+x^5+x^4+x^2+1)$;

(b) logically combining said computed first and second CRCs and writing said logically combined result into a local register on the chip;

(c) storing at least one CRC signature in a buffer, each CRC signature in said buffer being previously derived over a counterpart n-bit data pattern as input applied to the function and as output from a reference copy of the function for the given coding polynomial;

(d) comparison matching the logically combined CRCs in the local register with the stored CRC signature as indexed from the buffer by the n-bit data pattern;

(e) in the event of a comparison match, either repeating steps (a)–(d) to another n-bit data pattern as an input or terminating the test;

(f) in the event of a comparison mismatch, isolating any nested subinterval of time to a predetermined resolution within which an error, erasure, or fault occurs by recursively repeating steps (a)–(d) over a subset of the n-bit data Pattern.

2. The method according to claim 1, wherein each CRC signature is stored in a buffer selected from the set consisting of another register or register group on the chip and another register or register group remote from the chip and communicatively accessible thereto.

3. The method according to claim 1, wherein the nested subinterval size and predetermined resolution is determined by the degree of the highest term in the CRC polynomial, and further wherein the recursively repeating steps (a)–(d) constitute a recursive subpartition search to locate the error, erasure, or fault within the nested subinterval of predetermined resolution.

4. The method according to claim 1, wherein step (f) further includes the steps of:

either assigning a transient attribution to an error, erasure, or fault in the event that recursive processing results in a comparison match; or assigning a location attribution to the nested interval within the n-bit string counterpart to the recursive level in the event that recursive processing results in a comparison mismatch.

5. The method according to claim 1, wherein said chip includes M functions, and further wherein said M functions on said chip are resolved in a predetermined order wherein steps (a)–(f) are recursively applied to each of the M functions in the predetermined order and compared with a counterpart one of M signature CRCs stored in the buffer as indexed by the data pattern and indicia of the function being tested.

6. The method according to claim 1, wherein said chip comprises any integral semiconductive substrate or the like upon which any self- or externally-clocked electronic circuits, pathways, or functions have been etched, layered, or deposited and to which external access is restricted to a finite number of ports or "pins".

7. A method for performing on-chip function checks and locating detected anomalies within a nested time interval, comprising the steps of:

(a) applying an n-bit data pattern as input to identical functional units located on counterpart failure independent chips;

(b) computing first and second cyclic redundancy checks (CRCs) over the n-bit data pattern input and over any output from the functional unit thereof on each chip for a CRC coding polynomial selected from the set expressed in Galois field arithmetic consisting of $(x^{16}+x^{12}+x^5+1)$ and $(x^{32}+x^{26}+x^{23}+x^{22}+x^{16}+x^{12}+x^{11}+x^{10}+x^8+x^7+x^5+x^4+x^2+1)$;

(c) logically combining said computed first and second CRCs and writing said logically combined result into a local register on the same chip and into a shadow register on the chip opposite;

(d) comparison matching the result in the local and shadow registers on each chip;

(e) in the event of a comparison match respectively on both chips, either repeating steps (a)–(d) to another n-bit data pattern input or terminating the test; and (f) in the event of a comparison mismatch on at least one of the chips, isolating any nested subinterval of time to a predetermined resolution within which an anomaly such as an error, erasure, or fault occurs by recursively repeating steps (a)–(d) over the n-bit pattern.

8. The method according to claim 7, wherein the nested subinterval size and predetermined resolution is determined by the degree of the highest term in the CRC polynomial, and further wherein the recursively repeating steps (a)–(d) constitute a recursive binary search to locate the error, erasure, or fault within the nested subinterval of predetermined resolution.

9. The method according to claim 7, wherein step (f) further includes the steps of:

either assigning a transient attribution to an error, erasure, or fault in the event that recursive processing results in a comparison match; or assigning a location attribution to the nested interval within the n-bit string counterpart to the recursive level in the event that recursive processing results in a comparison mismatch, assigning a location attribution to the nested interval within the n-bit string counterpart to the recursive level in the event that recursive processing results in a comparison mismatch.

10. The method according to claim 7, wherein a first one of the pair of chips is remotely located from a second one of the pair of chips, and further wherein said second one of said pair of chips is communicatively and operatively shared as the second one among a plurality of pairs of chips.

11. The method according to claim 7, wherein each chip of a pair includes a clocking circuit and an arrangement for distributing clocking pulses to the local and shadow registers on each chip, and further wherein the step of writing said logically combined result into a shadow register on the chip opposite the pair includes the steps of:

encoding a synch mark onto the result at a first chip of the pair;

communicating said synch mark and result to a second chip of the pair; and at the second chip, extracting said synch mark, mapping said synch mark and result into only the result, writing said result into said shadow register, and applying said extracted synch mark to the local clocking circuit as an adjustment.

12. The method according to claim 11, wherein said step further comprises the step of bilaterally applying said synch marks to the clock circuits such that the clock circuits would both slew to a common point of resonance.

* * * * *